United States Patent [19]

Sommer et al.

[11] 3,978,039
[45] Aug. 31, 1976

[54] DISULPHIMIDOPHENYL-AZO-NAPHTHYL-AZO-AMINOPHENYL DYESTUFFS

[75] Inventors: Richard Sommer, Leverkusen; Gerhard Wolfrum, Bergisch-Neukirchen, both of Germany

[73] Assignee: Bayer Aktiengesellschaft, Leverkusen, Germany

[22] Filed: May 10, 1974

[21] Appl. No.: 468,933

[30] Foreign Application Priority Data

May 12, 1973 Germany............................ 2324067

[52] U.S. Cl................................. 260/187; 260/152; 260/174; 260/177; 260/178; 260/184; 260/186; 260/191
[51] Int. Cl.².................. C09B 31/04; C09B 31/08; C09B 31/14; D06P 3/24
[58] Field of Search........... 260/174, 177, 178, 184, 260/186, 187, 191

[56] References Cited
UNITED STATES PATENTS

| | | | |
|---|---|---|---|
| 2,295,050 | 9/1942 | Reynolds et al. | 260/160 |
| 2,766,231 | 10/1956 | Bolliger | 260/163 |
| 2,891,049 | 6/1959 | Exner et al. | 260/199 |
| 2,909,516 | 10/1959 | Jung | 260/196 |
| 3,134,761 | 5/1964 | Ackermann et al. | 260/160 X |

FOREIGN PATENTS OR APPLICATIONS

426,059   6/1967   Switzerland......................... 260/186

*Primary Examiner*—Floyd D. Higel
*Attorney, Agent, or Firm*—Plumley & Tyner

[57] ABSTRACT

Disazo dyestuffs of the formula wherein
$R_1$ represents an aromatic radical, an aliphatic radical with 1–4 C atoms or a dialkylamino radical in which the alkyl groups contain 1–4 C atoms,
$R_2$ represents chlorine, bromine, an alkyl group with 1–4 C atoms, an alkoxy group with 1–4 C atoms or a hydroxyl group,
$R_3$ represents hydrogen, chlorine, bromine, an alkyl group with 1–4 C atoms, an alkoxy group with 1–4 C atoms or an aryloxy group,
$R_4$ represents hydrogen, chlorine, bromine, an alkyl group with 1–4 C atoms, an alkoxy group with 1–4 C atoms or an acylamino group,
$R_5$ represents hydrogen or an alkyl group,
$R_6$ represents an alkyl group,
$n$ represents the numbers 0, 1 and 2 and
B represents a radical of the formula are suitable for dyeing synthetic fiber materials, especially those of polyamides.

5 Claims, No Drawings

DISULPHIMIDOPHENYL-AZO-NAPHTHYL-AZO-AMINOPHENYL DYESTUFFS

The present invention relates to disazo dyestuffs which in the form of the free acid correspond to the formula

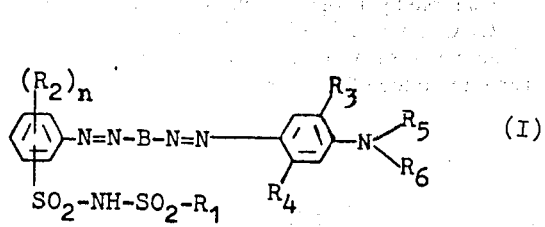

and to their preparation, and use for dyeing synthetic fibre materials, especially those of polyamides.

In the general formula (I)

$R_1$ represents an aromatic radical, an aliphatic radical with 1–4 C atoms or a dialkylamino radical in which the alkyl groups contain 1–4 C atoms, $R_2$ represents chlorine, bromine, an alkyl group with 1–4 C atoms, an alkoxy group with 1–4 C atoms or a hydroxyl group, $R_3$ represents hydrogen, chlorine, bromine, an alkyl group with 1–4 C atoms, an alkoxy group with 1–4 C atoms or an aryloxy group, $R_4$ represents hydrogen, chlorine, bromine, an alkyl group with 1–4 C atoms, an alkoxy group with 1–4 C atoms or an acylamino group, $R_5$ represents hydrogen or an alkyl group, $R_6$ represents an alkyl group, $n$ represents the numbers 0, 1 and 2 and B represents a radical of the formula

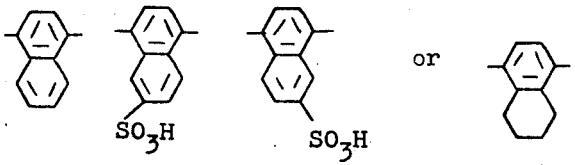

The disulphimide group of the formula (I) is in the ortho-, meta- or para-position relative to the azo bridge.

Suitable aromatic radicals $R_1$ are, in particular, phenyl radicals. The phenyl radicals can possess further substituents, for example $C_1$–$C_4$-alkyl groups, $C_1$–$C_4$-alkoxy groups, halogen, nitrile, nitro and the like. Phenyl and tolyl are preferred. Further suitable aromatic radicals $R_1$ are 1- and 2-naphthyl radicals. The aliphatic radicals $R_1$ are, in particular, alkyl radicals.

Examples of suitable dialkylamino radicals $R_1$ are dimethylamino, diethylamino and dibutylamino.

The alkyl and alkoxy group $R_2$, $R_3$ and $R_4$ can be substituted further, for example by halogen, nitrile, hydroxyl or optionally substituted phenyl. Examples of suitable alkyl groups $R_2$, $R_3$ and $R_4$ are —$CH_3$, —$C_2H_5$, —$C_3H_7$, —$C_4H_9$, —$C_2H_4CN$, —$CH_2$—$C_6H_5$ and $CF_3$.

Examples of suitable alkoxy groups $R_2$, $R_3$ and $R_4$ are —$OCH_3$, —$OC_2H_5$, —$OC_3H_7$, —$OC_4H_9$, —$OCH_2CH_2OH$ and —$OCH_2$—$C_6H_5$.

Examples of suitable aryloxy groups $R_3$ are phenoxy groups, especially phenoxy and tolyloxy.

By acylamino groups there are in particular understood formylamino, alkylcarbonylamino, cycloalkylcarbonylamino, alkenylcarbonylamino, phenylcarbonylamino, hetarylcarbonylamino, alkylsulphonylamino, phenylsulphonylamino and alkoxycarbonylamino groups, wherein the alkyl and phenyl radicals can be substituted further and the alkyl, alkenyl and alkoxy radicals preferably have 1–4 C atoms. The cycloalkyl radicals preferably have 5—7 ring members.

Examples of suitable acylamino groups are formylamino, acetylamino, propionylamino, β-chloropropionylamino, butyrylamino, methylsulphonylamino, phenylsulphonylamino, hydroxyacetylamino, phenoxyacetylamino, benzoylamino, p-chlorobenzoylamino, 2,5-dichlorobenzoylamino, phenacetypamino, ethoxycarbonylamino, methoxycarbonylamino and propoxycarbonylamino radicals. Examples of suitable hetarylcarbonylamino groups are furanoylamino and thenoylamino.

By alkyl radicals $R_5$ and $R_6$ there are in particular understood those with 1–4 C atoms, which can optionally be substituted further, for example by halogen, such as chlorine and bromine, by nitrile, hydroxyl, alkoxy with 1–4 C atoms, aryloxy, such as phenoxy or tolyloxy, benzyloxy, by $C_1$–$C_4$-alkylcarbonyloxy, alkoxycarbonyloxy with 1–4 C atoms in the alkoxy radical, alkoxycarbonyl with 1–4 C atoms in the alkoxy radical or by aryl, for example phenyl radicals which are optionally substituted further.

As examples of suitable alkyl radicals $R_5$ and $R_6$ there may be mentioned: —$CH_3$, —$C_2H_5$, —$C_3H_7$, —$C_4H_9$, —$CH_2$—$CH_2$—$CN$, —$CH_2$—$CH_2$—$OH$, —$CH_2$—$CH_2$—$O$—$CH_3$, —$CH_2$—$CH_2$—$O$—$CO$—$CH_3$, —$CH_2$—$CH_2$—$O$—$CO$—$C_2H_5$, —$CH_2$—$CH_2$—$O$—$CO$—$C_3H_7$, —$CH_2$—$CH_2$—$O$—$CO$—$OCH_3$, —$CH_2$—$CH_2$—$O$—$OC$—$OC_2H_5$, —$CH_2$—$CH_2$—$O$—$CO$—$OC_4H_9$, —$CH_2$—$C_6H_5$, —$CH_2$—$CH_2$—$C_6H_5$, —$CH_2$—$CH_2$—$Cl$, —$CH_2$—$CH_2$—$COO$—$CH_3$, $CH_2$—$CH_2$—$COOC_2H_5$, —$CH_2$—$CH$—$CH_3$, —$CH_2$—$CH$—$CH_2OH$,
         |                      |
         OH                    OH —$CH_2$—$CH_2$—$O$—$CO$—$C_6H_5$, —$CH_2$—$CH_2$—$O$—$CO$—$CH_2$—$C_6H_5$ and —$CH_2$—$CH_2$—$O$—$CH_2$—$C_6H_5$.

Preferred dyestuffs are those which in the form of the free acid correspond to the general formula

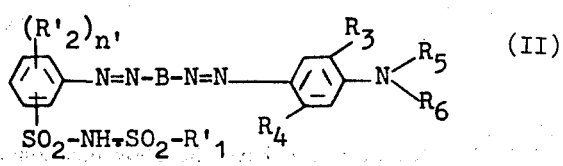

wherein
- B, $R_3$, $R_4$, $R_5$ and $R_6$ have the abovementioned meaning,
- $R'_1$ represents an aromatic radical or an alkyl radical with 1–4 C atoms,
- $R'_2$ represents chlorine, bromine, methyl, ethyl, methoxy, ethoxy, trifluoromethyl or hydroxyl and
- $n'$ represents the number 0 or 1.

Particularly preferred dyestuffs are those which in the form of the free acid correspond to the formula

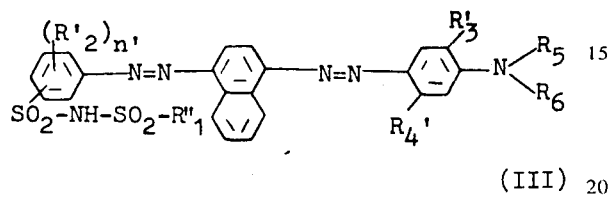

(III)

wherein
- $R'_2$, $R_5$, $R_6$ and $n'$ have the abovementioned meaning and
- $R''_1$ represents an optionally substituted phenyl radical or an alkyl group with 1–4 C atoms,
- $R'_3$ represents hydrogen, chlorine, bromine, methyl, ethyl, methoxy or ethoxy and
- $R'_4$ represents hydrogen, chlorine, bromine, methyl, ethyl, methoxy, ethoxy or an acylamino group and the disulphimide group is in the meta-position or para-position relative to the azo group, especially those dyestuffs which in the form of the free acid correspond to the formula

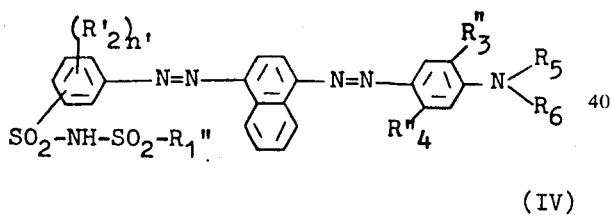

(IV)

wherein
- $R''_1$, $R'_2$, $R_5$, $R_6$ and $n'$ have the abovementioned meaning,
- $R''_3$ represents hydrogen, methyl, ethyl, methoxy or ethoxy and
- $R''_4$ represents an acylamino group and the disulphimide group is in the meta-position or para-position relative to the azo bridge.

Very particularly preferred dyestuffs are those which in the form of the free acid correspond to the formula

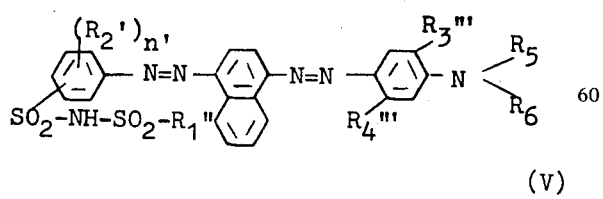

(V)

wherein
- $R''_1$, $R'_2$, $R_5$, $R_6$ and $n$ have the abovementioned meaning,

- $R'''_3$ represents hydrogen, methoxy or ethoxy and
- $R'''_4$ represents $C_1$–$C_4$-alkylcarbonylamino, which can optionally be substituted, for example by phenyl, phenoxy or hydroxyl, $C_1$–$C_4$-alkoxycarbonylamino, which can optionally be substituted, for example by phenyl, phenoxy or hydroxyl, or benzoylamino which is optionally substituted, for example by halogen, such as chlorine and bromine, $C_1$–$C_4$-alkoxy, $C_1$–$C_4$-alkyl, nitro or nitrile.

The new disazo dyestuffs (I) are prepared by diazotising an amine of the formula

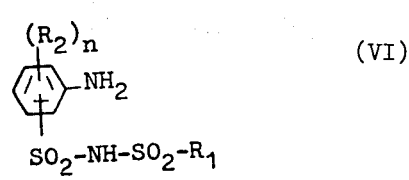

(VI)

wherein
- $R_1$, $R_2$ and $n$ have the abovementioned meaning and coupling the product with an amine of the formula $$H-B-NH-Q$$ (VII)

wherein
- Q represents hydrogen or the $-CH_2-SO_3H$ or $-SO_3H$ radicals, diazotising the monoazo dyestuff of the formula

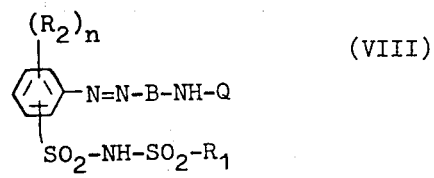

(VIII)

wherein
- $R_1$, $R_2$, $R_3$, $R_4$, Q and $n$ have the indicated meaning, if necessary after converting the $-NH-Q$ grouping into a $-NH_2$ group, and coupling the product with an aniline derivative of the formula

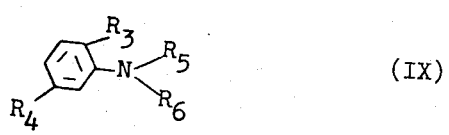

(IX)

As examples of suitable disulphimides of the formula (VI) there may be mentioned: (3-amino-benzenesulphonyl)-benzenesulphonamide, (3-amino-4-chloro-benzenesulphonyl)-benzenesulphonamide, (3-amino-benzenesulphonyl)-methanesulphonamide, (3-amino-benzenesulphonyl)-propanesulphonamide, (3-amino-benzenesulphonyl)-butanesulphonamide, (3-amino-benzenesulphonyl)-p-toluenesulphonamide, (3-amino-benzenesulphonyl)-o-toluenesulphonamide, (3-amino-4-chloro-benzenesulphonyl)-p-toluenesulphonamide, (3-amino-4-chloro-benzenesulphonyl)-methanesulphonamide, (3-amino-4-chloro-benzenesulphonyl)-butanesulphonamide, (3-amino-4-chloro-benzenesulphonyl)-o-toluenesulphonamide, (3-amino-6-methyl-benzenesulphonyl)-benzenesulphonamide, (3-amino-6-methyl-benzenesulphonyl)-butanesulphonamide, (3-amino-6-methyl-benzenesulphonyl)-methanesulphonamide, (3-amino-6-methyl-benzenesulphonyl)-p-toluenesulphonamide, (3-amino-6-methyl-benzenesulphonyl)-o-toluenesulphonamide, (3-amino-4-methyl-benzenesulphonyl)-benzenesulphonamide, (3-amino-4-methyl-benzenesulphonyl)-p-toluenesulphonamide, (3-amino-4-methyl-benzenesulphonyl)-o-toluenesulphonamide, (3-amino-4-methyl-benzenesulphonyl)-methanesulphonamide, (3-amino-4-methoxy-benzenesulphonyl)-benzenesulphonamide, (3-amino-4-methoxy-benzenesulphonyl)-p-toluenesulphonamide, (3-amino-4-methoxy-benzenesulphonyl)-methanesulphonamide, (3-amino-4-methoxy-benzenesulphonyl)-butanesulphonamide, (3-amino-6-methoxy-benzenesulphonyl)-benzenesulphonamide, (3-amino-6-methoxy-benzenesulphonyl)-p-toluenesulphonamide, (3-amino-6-methoxy-benzenesulphonyl)-methanesulphonamide, (3-amino-6-methoxy-benzenesulphonyl)-butanesulphonamide, (2-amino-benzenesulphonyl)-benzenesulphonamide, (2-amino-benzenesulphonyl)-p-toluenesulphonamide, (2-amino-benzenesulphonyl)-o-toluenesulphonamide, (2amino-benzenesulphonyl)-methanesulphonamide, (2-amino-benzenesulphonyl)-butanesulphonamide, (3-amino-6-ethyl-benzenesulphonyl)-benzenesulphonamide, (3-amino-6-ethyl-benzenesulphonyl)-p-toluenesulphonamide, (3-amino-6-ethyl-benzenesulphonyl)-methanesulphonamide, (3-amino-4-ethyl-benzenesulphonyl)-benzenesulphonamide, (3-amino-6-ethoxy-benzenesulphonyl)-benzenesulphonamide, (3-amino-6-ethoxy-benzenesulphonyl)-p-toluenesulphonamide, (3-amino-6-chloro-benzenesulphonyl)-benzenesulphonamide, (3-amino-6-chloro-benzenesulphonyl)-p-toluenesulphonamide, (3-amino-6-chloro-benzenesulphonyl)-o-toluenesulphonamide, (4-amino-benzenesulphonyl)-p-toluenesulphonamide, (4-amino-benzenesulphonyl)-o-toluenesulphonamide, (4-amino-benzenesulphonyl)-methanesulphonamide, (4-amino-benzenesulphonyl)-butanesulphonamide, (3-amino-4-bromo-benzenesulphonyl)-benzenesulphonamide, (3-amino-4-bromo-benzenesulphonyl)-p-toluenesulphonamide, (3-amino-4-bromo-benzenesulphonyl)-o-toluenesulphonamide, (3-amino-4-bromo-benzenesulphonyl)-methanesulphonamide, (3-amino-4-bromo-benzenesulphonyl)-butanesulphonamide, (2-amino-3-chloro-4-methyl-benzensulphonyl)-benzenesulphonamide, (2-amino-3-chloro-4-methoxy-benzenesulphonyl)-benzenesulphonamide, (3-amino-4-chloro-5-methyl-benzenesulphonyl)-benzenesulphonamide, (3-amino-5-chloro-6-methyl-benzenesulphonyl)-benzenesulphonamide, (3-amino-5-chloro-6-methyl-benzenesulphonyl)-methanesulphonamide, (4-amino-5-chloro-benzenesulphonyl)-benzenesulphonamide, (4-amino-3-chloro-benzenesulphonyl)-methanesulphonamide, (4-amino-5-chloro-benzenesulphonyl)-methanesulphonamide, (4-amino-5-methyl-benzeneslphonyl)-benzenesulphonamide, (3-amino-benzenesulphonyl)-1-naphthylsulphonamide, (4-amino-benzenesulphonyl)-2-naphthylsulphonamide, (3-amino-benzenesulphonyl)-N,N-dimethylaminosulphonamide, (4-amino-benzenesulphonyl)-N,N-diethylaminosulphonamide, (3-amino-benzenesulphonyl)-N,N-dibutylamino-sulphonamide, (3-amino-4-hydroxy-benzenesulphonyl)-methanesulphonamide, (3-amino-4-hydroxy-benzenesulphonyl)-benzenesulphonamide, and (3-amino-4-trifluoromethyl-benzenesulphonyl)-benzenesulphonamide.

Examples of suitable coupling components of the formula (IX) are: N,N-dimethylaniline, N,N-diethylaniline, N-methyl-N-n-butylaniline, N,N-diethyl-m-toluidine, N,N-diethylamino-3-chlorobenzene, N,N-diethyl-N'-formyl-m-phenylenediamine, N,N-diethyl-N'-acetyl-m-phenylenediamine, N,N-diethyl-N'-3-propionyl-m-phenylenediamine, N,N-diethylamino-3-methoxybenzene, 1-N,N-diethylamino-2,5-dimethoxybenzene, 1-N,N-diethylamino-2,5-diethoxybenzene, 1-N,N-diethylamino-2-methoxy-3-acetylaminobenzene, N-ethyl-N-β-chloroethyl-aniline, N,N-bis-(β-chloroethyl)-aniline, N-(β-chloroethyl)-N-butyl-aniline, N-(β-chloroethyl)-N-ethyl-m-toluidine, N,N-bis-(β-chloroethyl)-m-toluidine, N-methyl-N-β-hydroxyethyl-aniline, N-ethyl-N-β-hydroxyethyl-aniline, N,N-bis-(β-hydroxyethyl)-aniline, N-butyl-N-(β-hydroxyethyl)-aniline, N,N-bis-(β,γ-dihydroxypropyl)-aniline, N-ethyl-N-benzyl-aniline, N-ethyl-N-benzyl-m-toluidine, N-ethyl-N-β-hydroxyethyl-m-toluidine, N,N-bis-(β-hydroxyethyl)-m-toluidine, 1-(N-ethyl-N-β-hydroxyethyl)-amino-2-methoxy-5-methylbenzene, N-ethyl-N-β-hydroxyethyl-N'-acetyl-m-phenylenediamine, N,N-bis-(β-hydroxyethyl)-N'-acetyl-m-phenylenediamine, 1-N,N-bis-(β-hydroxyethyl)-amino-2-methoxy-5-acetylaminobenzene, 1-N,N-bis-(β-hydroxyethyl)-amino-2-ethoxy-5-acetylaminobenzene, 1-N,N-bis-(β-hydroxyethyl)-amino-2-methoxy-5-propionylaminobenzene, N-ethyl-N-β-acetoxyethylaniline, N,N-bis-(β-acetoxyethyl)-aniline, N-butyl-N-β-acetoxyethyl-aniline, N-ethyl-N-β-acetoxyethyl-m-toluidine, N,N-bis-(β-acetoxyethyl)-m-toluidine, 1-N-ethyl-N-β-acetoxyethylamino-2-methoxy-5-methylbenzene, N-ethyl-N-β-acetoxyethyl-N'-acetyl-m-phenylenediamine, N,N-bis-(β-acetoxyethyl)-N'-acetyl-m-phenylenediamine, 1-N,N-bis-(β-acetoxyethyl)-amino-2-methoxy-5-acetylamino-benzene, 1-N,N-bis-(β-acetoxyethyl)-amino-2-ethoxy-5-acetylamino-benzene, 1-N,N-(β-acetoxyethyl)-amino-2-methoxy-5-propionylaminobenzene, N,N-bis-(β-ethoxycarbonyloxyethyl)-aniline, N,N-bis-(β-methoxycarbonyloxyethyl)-aniline, N,N-bis-(β-ethoxycarbonyloxyethyl)-m-toluidine, N,N-bis-(β-methoxycarbonyloxyethyl)-m-toluidine, N,N-bis-(β-ethoxycarbonyloxyethyl)-N'-acetyl-m-phenylenediamine, N,N-bis-(β-methoxycarbonyloxyethyl)-N'-acetyl-m-phenylenediamine, 1-N,N-bis-(β-ethoxycarbonyloxyethyl)-amino-2-methoxy-5-acetylaminobenzene, 1-N,N-bis-(β-methoxycarbonyloxyethyl)-amino-2-methoxy-5-acetylaminobenzene, 1-N,N-bis-(β-ethoxycarbonyloxyethyl)-amino-2-ethoxy-5-acetylaminobenzene, 1-N,N-bis-(β-methoxycarbonyloxyethyl)-amino-2-ethoxy-5-acetylamino-benzene, N,N-bis-(β-carbomethoxyethyl)-N'-acetyl-m-phenylenediamine, N-methyl-N-β-cyanoethylaniline, N,N-bis-(β-cyanoethyl)-aniline, N-ethyl-N-β-cyanoethyl-m-toluidine, N-ethyl-N-β-cyanoethyl-N'-acetylamino-m-phenylenediamine, N-β-hydroxyethyl- N-β-cyanoethylaniline, N-β-acetoxy-ethyl-N-β-cyanoethyl-m-toluidine, N-β-methoxycarbonyloxyethyl-N-β-cyanoethyl-N'-acetylamino-m-phenylenediamine, N,N-bis-(β-cyanoethyl)-N'-benzoyl-m-phenylenediamine, N-β-hydroxyethyl-N-β-cyanoethyl-N'-phenacetyl-m-phenylenediamine, N,N-diethyl-N'-phenoxyacetyl-m-phenylenediamine, N-ethyl-N-β-cyanoethyl-N'-phenoxyacetyl-m-phenylenediamine, N,N-bis-(β-cyanoethyl)-N'-p-chlorobenzoyl-m-phenylenediamine, N-ethyl-N-β-phenylethyl-aniline, N-ethyl-N-β-phenylethyl-m-toluidine, N-butyl-N-β-phenylethyl-aniline, N-butyl-N-β-phenylethyl-m-toluidine, N-β-cyanoethyl-N-β-phenylethyl-aniline, N-β-cyanoethyl-N-β-phenylethyl-m-toluidine, N-ethyl-N-β-methoxyethylaniline, N-ethyl-N-β-methoxyethyl-m-toluidine, 1-N,N-diethylamino-2-methoxy-5-methanesulphonylamino-benzene, 1-N,N-bis-(β-hydroxyethyl)-amino-2-ethoxy-5-benzenesulphonylaminobenzene, 1-(N-ethyl-N-β-cyanoethyl)-amino-2-methoxy-5-formylamino-benzene, 1-(N-methyl-N-ethyl)-amino-2-ethoxy-5-benzenesulphonylamino-benzene, 1-N,N-dipropylamino-2-methoxy-5-ethanesulphonylamino-benzene, N,N-diethylamino-N'-acryloyl-m-phenylenediamine, 1-N,N-diethylamino-2-methoxy-5-methacryloylamino-benzene, 1-(N-β-acetoxyethyl-N-ethyl)-amino-2-ethoxy-5-(2'-thenoylamino)-benzene, 1-(N-ethyl-N-β-cyanoethyl)-amino-2-methoxy-5-cyclohexylcarbonylamino-benzene, N,N-diethylamino-N'-ethoxycarbonyl-m-phenylenediamine, 1-(N-β-acetoxyethyl-N-ethyl)-amino-2-methoxy-5-methoxycarbonylamino-benzene, 1-(N-β-cyanoethyl-N-ethyl)-amino-2-ethoxy-5-propoxycarbonylaminobenzene and 1-(N-β-hydroxyethyl-N-ethyl)-amino-2-methoxy-5-ethoxycarbonylamino-benzene.

The dyestuffs according to the invention are suitable for dyeing natural and synthetic fibre materials, for example of wool, silk and polyamide, especially for dyeing polyamide fibres in level, red, blue and black shades of good yield and of a good level of fastness.

By polyamide fibres there are in particular understood those of synthetic polyamides such as ε-polycaprolactam or condensation products of adipic acid and hexamethylenediamine. The dyestuffs can, for this purpose, be employed either in the form of the free acids ($-SO_2-NH-SO_2$) or in the form of their salts, especially the alkali metal salts, preferably the sodium salts or the ammonium salts, but also in the form of the lithium salts.

The amines of the formula (VI) are diazotised according to methods which are in themselves known, preferably by means of sodium nitrite, in an aqueous solution containing mineral acid. The coupling of the diazonium compounds of the amines of the formula (VI) with the coupling components of the formula (VII) can be effected according to methods which are in themselves known, for example in a neutral to strongly acid pH range, but preferably in a weakly acid pH range, in an aqueous or aqueous-organic medium.

The monoazo dyestuffs of the formula (VIII) are isolated according to known methods, for example by filtration or by salting out with a salt which is soluble in aqueous solution, for example with NaCl or KCl, with subsequent filtration. If coupling components of the formula (VII) with Q = $SO_3H$ or $-CH_2-SO_3H$ are employed, isolation of the monoazo dyestuffs is frequently only necessary after the liberation of the amino group of the coupling component by alkaline or acid saponification. Intermediate isolation of the monoazo dyestuffs is, however, not always necessary — they can also be diazotised further without isolation.

The further diazotisation of the aminoazo dyestuffs (VIII) with Q = H can be effected, for example, with sodium nitrite solution, in acid, aqueous dispersion in which case the diazotisation temperatures can be between 0° and 30°C. Aminoazo dyestuffs of the formula (VIII) with Q = H can furthermore also be diazotised indirectly by dissolving them in an alkaline medium, adding sodium nitrite solution and pouring the mixture into aqueous hydrochloric acid or adding hydrochloric acid to the mixture.

The coupling of the diazotised aminoazo dyestuffs (VIII) with the end components (IX) to give the disazo dyestuffs (I) is also carried out in the usual manner, preferably in a weakly acid aqueous medium. The disazo dyestuffs of the formula (I) can be isolated by simply filtering them off, if necessary after addition of sodium chloride. If the dyestuffs are obtained in an impure form they can be redissolved, and reprecipitated, in a known manner from hot water, if necessary with addition of alkali.

The more sparingly soluble dyestuffs (I) can be rendered readily water-soluble by mixing them with salts of strong bases and weak acids, for example trisodium phosphate, disodium hydrogen phosphate, sodium tetraborate, sodium metaphosphate, sodium metasilicate or sodium carbonate.

The new dyestuffs of the formula (I) can be isolated in the form of the free acid or as alkali metal salts or ammonium salts, or can be in these forms, or can be employed in these forms for further use. Suitable alkali metal salts in which the hydrogen atom of the $-SO_2-NH-SO_2-$ group is thus replaced by an alkali metal cation are, for example, the sodium, potassium or lithium salts.

EXAMPLE 1

31.2 g of (3-amino-benzenesulphonyl)-benzenesulphonamide are dissolved in 200 ml of water with addition of 10% strength sodium hydroxide solution, and mixed with 7.0 g of sodium nitrite. The solution thus obtained is allowed to run into 200 g of ice/$H_2O$ and 35 g of concentrated hydrochloric acid and is diazotised in 0.5 hours at 0°–5°C; The excess nitrous acid is then removed with amidosulphonic acid. A solution of 14.3 g of α-naphthylamine in 280 ml of water and 11 g of concentrated hydrochloric acid, warmed to 50°C, is added dropwise to the suspension of the diazonium compound and the coupling mixture is kept at 10°–15°C by addition of ice. After stirring overnight, the aminoazo dyestuff produced is filtered off. It is dissolved in 500 ml of water at approx. 60°C and pH 9–10 through addition of concentrated sodium hydroxide solution, 7.0 g of sodium nitrite are then also dissolved in the mixture and the solution, at 60°C, is allowed to run into 30 g of concentrated hydrochloric acid and 100 ml of water. The temperature is kept at approx. 10°C by addition of ice. At this temperature, the mixture is stirred for a further 2 hours and the excess nitrite is then destroyed with amidosulphonic acid. The suspension of the diazonium compound is combined with a solution of 16 g of 3-diethylamino-acetanilide in 200 ml of water and 7 g of dilute sulphuric acid. The temperature is kept at 10°C by addition of ice and the mixture is slowly neutralised to pH 3 by addition of sodium acetate solution. After completion of coupling, the disazo dyestuff is isolated by filtration. It can be purified by dissolving it in water at 70°–80°C and salting out with sodium chloride. In the form of the free acid, the dyestuff corresponds to the formula

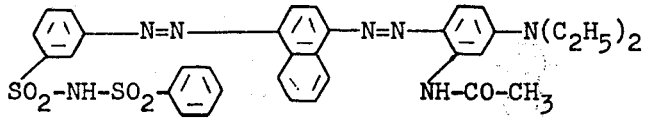

and dyes synthetic polyamides in reddish-blue shades of very good fastness to wet processing and good fastness to light.

DYEING EXAMPLE 0.1 g of the dyestuff of Example 1 is dissolved in 100 ml of hot water, 5 ml of 10% strength ammonium acetate solution are added and the mixture is diluted to a volume of 500 ml with water. 10 g of polyamide fibers are introduced into the dyebath, which is brought to the boil over the course of 20 minutes, 4 ml of 10% strength acetic acid are added and the bath is kept at the boil for 1 hour. The fibers are then rinsed and dried at 70°–80°C.

EXAMPLE 2

If the procedure in Example 1 is followed and coupling is carried out with 19.6 g of 3-(N-β-cyanoethyl-N-ethyl)-4-methoxy-acetanilide, dissolved in 200 ml of water and 7 g of dilute sulphuric acid, instead of with 3-diethamino-acetanilide, a dyestuff is obtained which in the form of the free acid corresponds to the formula

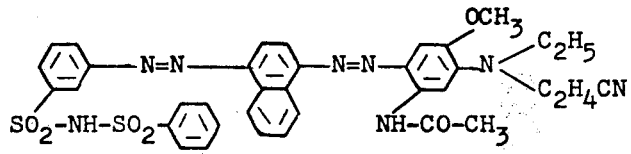

and dyes synthetic polyamides in blue shades of a very good level of fastness.

EXAMPLE 3

If the procedure in Example 1 is followed, but instead of (3-amino-benzenesulphonyl)-benzenesulphonamide 34.7 g of (3-amino-4-chloro-benzenesulphonyl)-benzenesulfphonamide are employed, the dyestuff obtained after the second coupling reaction corresponds, in the form of the free acid, to the formula

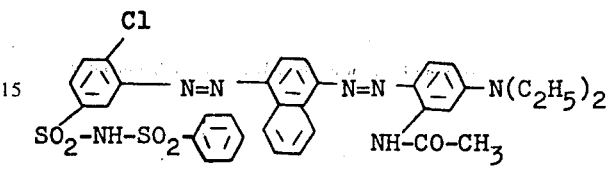

and dyes synthetic polyamides in navy blue shades.

EXAMPLE 4

32.8 g of (3-amino-4-hydroxy-benzenesulphonyl)-benzenesulphonamide are diazotised analogously to Example 1 and coupled to α-naphthylamine. Further diazotisation of the aminoazo dyestuff as in Example 1, and coupling to 18.3 g of 3-diethylamino-4-methoxy-acetanilide gives a dyestuff which in the form of the free acid corresponds to the formula

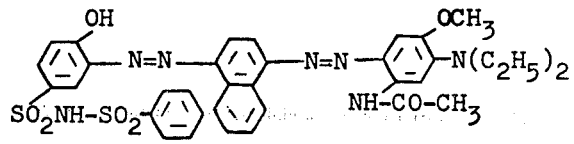

and dyes synthetic polyamides in black shades of very good fastness to light and to wet processing.

If the procedure indicated in the preceding example is followed and the initial components, middle components and end components listed in the tables which follow are used, further disazo dyestuffs of the general formula (I) are obtained, which dye polyamide in red to blue-black shades of similar fastness properties.

| Example | Initial component | Middle component | End component |
| --- | --- | --- | --- |
| 5 | (3-Amino-benzenesulphonyl)-benzenesulphonamide | naphthalene | aniline with N(C₂H₅)₂ and CH₃ |
| 6 | (3-Amino-benzenesulphonyl)-benzenesulphonamide | naphthalene | anisidine with NH-C₂H₄CN, OCH₃ and CH₃ |

-continued

| Example | Initial component | Middle component | End component |
|---|---|---|---|
| 7 | (3-Amino-benzenesulphonyl)-benzenesulphonamide | naphthyl | 4-OC$_2$H$_5$, 3-N(C$_2$H$_5$)$_2$, 6-NH-CO-C$_2$H$_5$ phenyl |
| 8 | (3-Amino-benzenesulphonyl)-benzenesulphonamide | naphthyl | 3-N(C$_2$H$_5$)$_2$, 5-NH-CO-C$_6$H$_5$ phenyl |
| 9 | (3-Amino-benzenesulphonyl)-benzenesulphonamide | naphthyl | 2-Cl, NH-C$_2$H$_5$ phenyl |
| 10 | (3-Amino-benzenesulphonyl)-benzenesulphonamide | naphthyl | 4-OCH$_3$, 3-N(C$_2$H$_5$)$_2$, 6-NH-SO$_2$-CH$_3$ phenyl |
| 11 | (3-Amino-benzenesulphonyl)-benzenesulphonamide | naphthyl | 4-OC$_2$H$_5$, 3-N(C$_2$H$_4$OH)$_2$, 6-NH-CO-CH$_2$-C$_6$H$_5$ phenyl |
| 12 | (3-Amino-benzenesulphonyl)-benzenesulphonamide | naphthyl | 4-OCH$_3$, 3-N(C$_2$H$_5$)(CH$_2$-C$_6$H$_5$), 6-NH-CO-CH$_3$ phenyl |
| 13 | (3-Amino-benzenesulphonyl)-benzenesulphonamide | naphthyl | 4-OCH$_3$, 3-N(C$_2$H$_5$)(C$_2$H$_4$-O-CH$_3$), 6-NH-CO-C$_3$H$_7$ phenyl |
| 14 | (3-Amino-benzenesulphonyl)-benzenesulphonamide | tetrahydronaphthyl | 3-N(C$_2$H$_5$)(C$_2$H$_4$-C$_6$H$_5$), 5-CH$_3$ phenyl |
| 15 | (3-Amino-benzenesulphonyl)-benzenesulphonamide | tetrahydronaphthyl | 3-N(CH$_3$)$_2$, 5-NH-CO-C$_6$H$_5$ phenyl |
| 16 | (3-Amino-benzenesulphonyl)-benzenesulphonamide | tetrahydronaphthyl | 3-N(C$_2$H$_5$)$_2$, 5-OCH$_3$ phenyl |

-continued

| Example | Initial component | Middle component | End component |
|---|---|---|---|
| 17 | (3-Amino-benzenesulphonyl)-benzenesulphonamide | 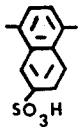 SO₃H | 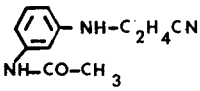 NH-C₂H₄CN / NH-CO-CH₃ |
| 18 | (3-Amino-benzenesulphonyl)-benzenesulphonamide | 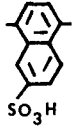 SO₃H | 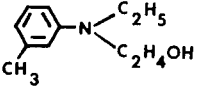 N(C₂H₅)(C₂H₄OH), CH₃ |
| 19 | (3-Amino-benzenesulphonyl)-benzenesulphonamide | 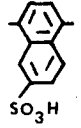 SO₃H | 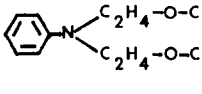 N(C₂H₄-O-CH₃)₂ |
| 20 | (3-Amino-benzenesulphonyl)-benzenesulphonamide | 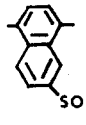 SO₃H | 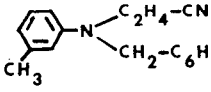 N(C₂H₄-CN)(CH₂-C₆H₅), CH₃ |
| 21 | (3-Amino-benzenesulphonyl)-benzenesulphonamide | 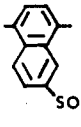 SO₃H | 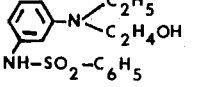 N(C₂H₅)(C₂H₄OH) / NH-SO₂-C₆H₅ |
| 22 | (3-Amino-benzenesulphonyl)-benzenesulphonamide | 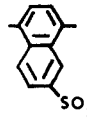 SO₃H | 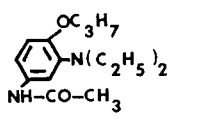 OC₃H₇, N(C₂H₅)₂ / NH-CO-CH₃ |
| 23 | (3-Amino-benzenesulphonyl)-benzenesulphonamide | 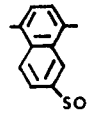 SO₃H | 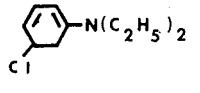 N(C₂H₅)₂, Cl |
| 24 | (3-Amino-4-chlorobenzenesulphonyl)-benzene-sulphonamide |  | 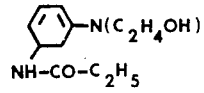 N(C₂H₄OH)₂ / NH-CO-C₂H₅ |
| 25 | (3-Amino-4-chlorobenzenesulphonyl)-benzene-sulphonamide | 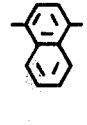 | 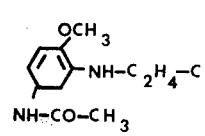 OCH₃, NH-C₂H₄-C₆H₅ / NH-CO-CH₃ |

-continued

| Example | Initial component | Middle component | End component |
|---|---|---|---|
| 26 | (3-Amino-4-chlorobenzenesulphonyl)-benzene-sulphonamide | naphthalene | 3-[N(C₃H₇)₂]-phenyl with NH-CO-CH₃ — $\underset{NH-CO-CH_3}{\text{C}_6\text{H}_3}\text{-N(C}_3\text{H}_7)_2$ |
| 27 | (3-Amino-4-chlorobenzenesulphonyl)-benzene-sulphonamide | naphthalene | phenyl with OC₂H₅, NH–C₂H₅, NH–CO–CH₃ |
| 28 | (3-Amino-4-chlorobenzenesulphonyl)-benzene-sulphonamide | naphthalene | phenyl with OCH₃, N(C₂H₄O–CO–CH₃)₂, NH–CO–CH₃ |
| 29 | (3-Amino-4-chlorobenzenesulphonyl)-benzene-sulphonamide | naphthalene | phenyl with N(C₂H₄CN)(C₂H₄–C₆H₅), C₂H₅ |
| 30 | (3-Amino-4-chlorobenzenesulphonyl)-benzene-sulphonamide | naphthalene | phenyl with OCH₃, NH–C₂H₄Cl, NH–CO–CH₃ |
| 31 | (3-Amino-4-chlorobenzenesulphonyl)-benzene-sulphonamide | naphthalene-SO₃H | phenyl with N(C₂H₄Cl)₂, NH–CO–C₂H₅ |
| 32 | (3-Amino-4-chlorobenzenesulphonyl)-benzene-sulphonamide | naphthalene-SO₃H | phenyl with OCH₃, NH–CH₂C₆H₅, NH–CO–C₂H₅ |
| 33 | (3-Amino-4-chlorobenzenesulphonyl)-p-toluene-sulphonamide | naphthalene | phenyl with N(C₂H₄–O–C₂H₅)₂, NH–CO–CH₃ |
| 34 | (3-Amino-4-chlorobenzenesulphonyl)-p-toluene-sulphonamide | naphthalene | phenyl with OCH₃, N(C₂H₅)₂, NH–CO–CH₂–O–C₆H₅ |

-continued

| Example | Initial component | Middle component | End component |
|---|---|---|---|
| 35 | (3-Amino-4-chlorobenzenesulphonyl)-p-toluene-sulphonamide |  | 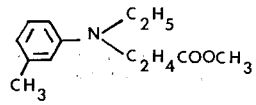 |
| 36 | (3-Amino-4-chlorobenzenesulphonyl)-p-toluene-sulphonamide |  | 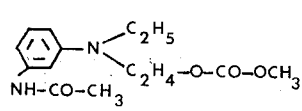 |
| 37 | (3-Amino-4-chlorobenzenesulphonyl)-p-toluene-sulphonamide |  | 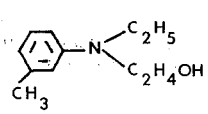 |
| 38 | (3-Amino-4-hydroxybenzenesulphonyl)-p-toluene-sulphonamide |  | 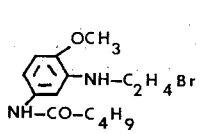 |
| 39 | (3-Amino-4-hydroxybenzenesulphonyl)-p-toluene-sulphonamide |  | 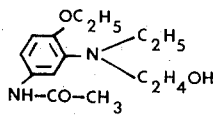 |
| 40 | (3-Amino-4-hydroxybenzenesulphonyl)-p-toluene-sulphonamide |  | 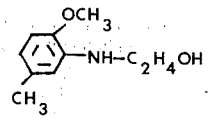 |
| 41 | (3-Amino-4-hydroxybenzenesulphonyl)-p-toluene-sulphonamide |  | 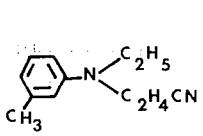 |
| 42 | (3-Amino-4-hydroxybenzenesulphonyl)-p-toluene-sulphonamide |  | 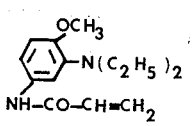 |
| 43 | (3-Amino-4-hydroxybenzenesulphonyl)-p-toluene-sulphonamide |  | 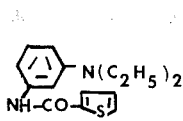 |
| 44 | (3-Amino-4-chloro-5-methyl-benzenesulphonyl)-benzenesulphonamide |  | 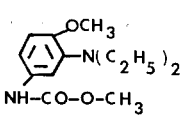 |

| Example | Initial component | Middle component | End component |
|---|---|---|---|
| 45 | (3-Amino-4-chloro-5-methyl-benzenesulphonyl)-benzenesulphonamide | naphthalene | phenyl-N(C$_2$H$_4$OH)$_2$, NH-CO-CH$_3$ |
| 46 | (3-Amino-4-chloro-5-methyl-benzenesulphonyl)-benzenesulphonamide | naphthalene | phenyl-N(C$_2$H$_4$CN)(C$_2$H$_4$OH), CH$_3$ |
| 47 | (3-Amino-4-chloro-5-methyl-benzenesulphonyl)-benzenesulphonamide | naphthalene | phenyl-N(C$_2$H$_4$CN)(C$_2$H$_4$-C$_6$H$_5$), CH$_3$ |
| 48 | (3-Amino-4-chloro-5-methyl-benzenesulphonyl)-benzenesulphonamide | naphthalene | phenyl-N(C$_2$H$_4$CN)(C$_2$H$_4$-O-CO-CH$_3$), CH$_3$ |
| 49 | (3-Amino-4-chloro-5-methyl-benzenesulphonyl)-benzenesulphonamide | naphthalene-SO$_3$H | phenyl-OCH$_3$, NH-C$_2$H$_4$CN, NH-CO-CH$_3$ |
| 50 | (3-Amino-4-chloro-5-methyl-benzenesulphonyl)-benzenesulphonamide | naphthalene-SO$_3$H | phenyl-OC$_2$H$_5$, N(C$_2$H$_5$)$_2$, NH-SO$_2$-phenyl-CH$_3$ |
| 51 | (4-Amino-benzenesulphonyl)-benzenesulphonamide | naphthalene | phenyl-N(C$_2$H$_5$)$_2$, NH-CHO |
| 52 | (4-Amino-benzenesulphonyl)-benzenesulphonamide | naphthalene | phenyl-OCH$_3$, NH-C$_2$H$_4$Cl, NH-CO-CH$_3$ |
| 53 | (4-Amino-benzenesulphonyl)-benzenesulphonamide | naphthalene | phenyl-OCH$_3$, N(C$_2$H$_5$)$_2$, NH-CO-C$_6$H$_{11}$ |
| 54 | (4-Amino-benzenesulphonyl)-benzenesulphonamide | naphthalene | phenyl-OC$_2$H$_5$, NH-C$_2$H$_4$CN, CO-C$_2$H$_5$ |

| Example | Initial component | Middle component | End component |
|---|---|---|---|
| 55 | (4-Amino-benzenesulphonyl)-benzenesulphonamide | naphthalene | 3-methylphenyl-N(C₂H₄-O-CH₃)(C₂H₅) |
| 56 | (4-Amino-benzenesulphonyl)-benzenesulphonamide | naphthalene | phenyl with N(C₂H₅)₂ and NH-CO-C(=CH₂)-CH₃ |
| 57 | (4-Amino-benzenesulphonyl)-benzenesulphonamide | naphthalene-SO₃H | 3-methylphenyl-N(C₂H₄CN)(C₂H₄-O-CO-CH₃) |
| 58 | (4-Amino-benzenesulphonyl)-benzenesulphonamide | naphthalene | 3-methylphenyl-N(C₂H₅)₂ |
| 59 | (4-Amino-benzenesulphonyl)-benzenesulphonamide | naphthalene | 3-methylphenyl-N(CH₂-C₆H₅)(C₂H₄-CN) |
| 60 | (3-Amino-5-chloro-6-methyl-benzenesulphonyl)-benzenesulphonamide | naphthalene | phenyl-N(C₂H₅)₂, NH-CO-CH₃ |
| 61 | (3-Amino-5-chloro-6-methyl-benzenesulphonyl)-benzenesulphonamide | naphthalene | phenyl-OCH₃, N(C₂H₅)₂, NH-CO-furyl |
| 62 | (3-Amino-5-chloro-6-methyl-benzenesulphonyl)-benzenesulphonamide | naphthalene | phenyl-N(C₂H₄OH)₂, NH-CO-C₆H₅ |
| 63 | (3-Amino-5-chloro-6-methyl-benzenesulphonyl)-benzenesulphonamide | naphthalene | phenyl-NH-C₂H₄CN, NH-CO-CH₃ |
| 64 | (4-Amino-5-methyl-benzenesulphonyl)-o-toluenesulphonamide | naphthalene | 3-methylphenyl-N(C₂H₅)(C₂H₄-O-CO-O-C₂H₅) |

-continued

| Example | Initial component | Middle component | End component |
|---|---|---|---|
| 65 | (4-Amino-5-methyl-benzenesulphonyl)-o-toluenesulphonamide | naphthalene | phenyl with $OC_2H_5$, $-N(C_2H_5)_2$, $NH-CO-C_3H_7$ |
| 66 | (4-Amino-5-methyl-benzenesulphonyl)-o-toluenesulphonamide | naphthalene | phenyl with $OCH_3$, $-NH-C_2H_4-Cl$, $NH-CO-CH_3$ |
| 67 | (4-Amino-5-methyl-benzenesulphonyl)-o-toluenesulphonamide | naphthalene-$SO_3H$ | phenyl with $OCH_3$, $-N(C_2H_5)_2$, $NH-CO-C_6H_5$ |
| 68 | (4-Amino-5-methyl-benzenesulphonyl)-o-toluenesulphonamide | naphthalene-$SO_3H$ | phenyl with $OCH_3$, $-N(C_2H_4OH)_2$, $NH-CO-CH_3$ |

Dyestuffs with similar properties and similar shades are obtained if the middle components and end components used in Examples 1–68 are employed, with the following (amino-benzenesulphonyl)-sulphonamides as initial components: (3-amino-benzenesulphonyl)-methanesulphonamide, (3-amino-benzenesulphonyl)-propaneesulphonamide, (3-amino-benzene-sulphonyl)-butanesulphonamide, (3-amino-benzenesulphonyl)-p-toluenesulphonamide, (3-amino-benzenesulphonyl)-o-toluene-sulphonamide, (3-amino-4-chloro-benzenesulphonyl)-o-toluene-sulphonamide, (3-amino-4-chloro-benzenesulphonyl)-butanesulphonamide, (3-amino-6-methyl-benzenesulphonyl)-benzenesulphonamide, (3-amino-6-methyl-benzenesulphonyl)-butanesulphonamide, (3-amino-6-methyl-benzenesulphonyl)-methanesulphonamide, (3-amino-6-methyl-benzenesulphonyl)-p-toluenesulphonamide, (3-amino-6-methyl-benzenesulphonyl)-o-toluenesulphonamide, (3-amino-4-methyl-benzenesulphonyl)-benzenesulphonamide, (3-amino-4-methyl-benzenesulphonyl)-p-toluenesulphonamide, (3-amino-4-methyl-benzenesulphonyl)-o-toluenesulphonamide, (3-amino-4-methyl-benzenesulphonyl)-methanesulphonamide, (3-amino-4-methoxy-benzenesulphonyl)-benzenesulphonamide, (3-amino-4-methoxy-benzenesulphonyl)-p-toluenesulphonamide, (3-amino-4-methoxy-benzenesulphonyl)-methanesulphonamide, (3-amino-4-methoxy-benzeneesulphonyl)-butanesulphonamide, (3-amino-6-methoxy-benzenesulphonyl)-benzenesulphonamide, (3-amino-6-methoxy-benzenesulphonyl)-p-toluenesulphonamide, (3-amino-6-methoxy-benzenesulphonyl)-methanesulphonamide, (3-amino-6-methoxy-benzenesulphonyl)-butanesulphonamide, (2-amino-benzenesulphonyl)-benzenesulphonamide, (2-amino-benzenesulphonyl)-p-toluenesulphonamide, (2-amino-benzenesulphonyl)-o-toluenesulphonamide, (2-amino-benzenesulphonyl)-methanesulphonamide, (2-amino-benzenesulphonyl)-butanesulphonamide, (3-amino-6-ethyl-benzenesulphonyl)-benzenesulphonamide, (3-amino-6-ethyl-benzenesulphonyl)-p-toluenesulphonamide, (3-amino-6-ethyl-benzenesulphonyl)-methanesulphonamide, (3-amino-4-ethyl-benzenesulphonyl)-benzenesulphonamide, (3-amino-6-ethoxy-benzenesulphonyl)-benzenesulphonamide, (3-amino-6-ethoxy-benzenesulphonyl)-p-toluenesulphonamide, (3-amino-6-chloro-benzenesulphonyl)-benzenesulphonamide, (3-amino-6-chloro-benzenesulphonyl)-p-toluenesulphonamide, (3-amino-6-chloro-benzenesulphonyl)-o-toluenesulphonamide, (4-amino-benzenesulphonyl)-p-toluenesulphonamide, (4-amino-benzenesulphonyl)-o-toluenesulphonamide, (4-amino-benzenesulphonyl)-methanesulphonamide, (4-amino-benzenesulphonyl)-butanesulphonamide, (3-amino-4-bromobenzenesulphonyl)-benzenesulphonamide, (3-amino-4-bromobenzenesulphonyl)-p-toluenesulphonamide, (3-amino-4-bromobenzenesulphonyl)-o-toluenesulphonamide, (3-amino-4-bromobenzenesulphonyl)-methanesulphonamide, (3-amino-4-bromobenzenesulphonyl)-butanesulphonamide, (2-amino-3-chloro-4-methyl-benzenesulphonyl)-benzenesulphonamide, (2-amino-3-chloro-4-methoxy-benzenesulphonyl)-benzenesulphonamide, (3-amino-4-chloro-5-methyl-benzenesulphonyl)-benzenesulphonamide, (3-amino-5-chloro-6-methyl-benzenesulphonyl)- p-toluenesulphonamide, (3-amino-5-chloro-6-methyl-benzenesulphonyl)-methanesulphonamide, (4-amino-5-chloro-benzenesulphonyl)-benzenesulphonamide, (4-amino-3-chloro-benzenesulphonyl)-methanesulphonamide, (4-amino-5-methyl-benzenesulphonyl)-methanesulphonamide, (4-amino-5-methyl-benzenesulphonyl)-benzenesulphonamide, (3-amino-4-chloro-benzenesulphonyl)-o-toluenesulphonamide, (3-amino- 4-chloro-benzenesulphonyl)-benzenesulphonamide, (3-amino-benzenesulphonyl)-1-naphthylsulphonamide, (4-amino-benzenesulphonyl)-2-naphthylsulphonamide, (3-amino-4-trifluoromethyl-benzenesulphonyl)-benzenesulphonamide and (4-amino-3-trifluoromethyl-benzenesulphonyl)-methanesulphonamide.

The following may be mentioned as examples of dyestuffs prepared in this way:

We claim:
1. Disazo dyestuff which in the form of the free acid corresponds to the formula

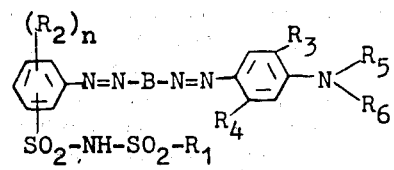

wherein the disulphimide group is in the ortho-, meta- or para-position relative to the azo bridge;

$R_1$ is phenyl, naphthyl, $C_1$–$C_4$-alkyl, di-$C_1$–$C_4$-alkylamino, or phenyl substituted by $C_1$–$C_4$-alkyl, $C_1$–$C_4$-alkoxy, halogen, cyano, or nitro;

$R_2$ is chlorine, bromine, $C_1$–$C_4$-alkyl, $C_1$–$C_4$-alkoxy,

| Example | | Shade on polyamide |
|---|---|---|
| Example 69 | 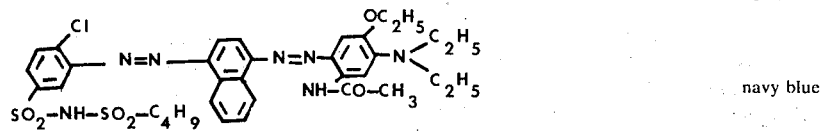 | navy blue |
| Example 70 | 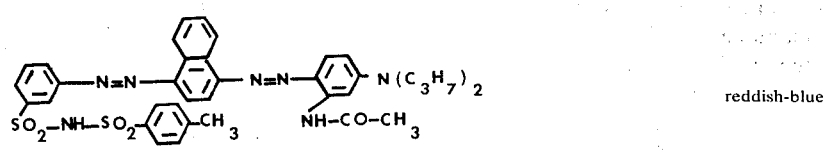 | reddish-blue |
| Example 71 | 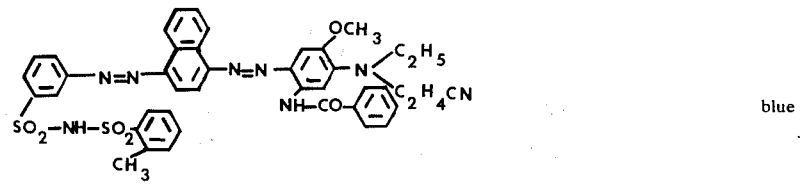 | blue |
| Example 72 | 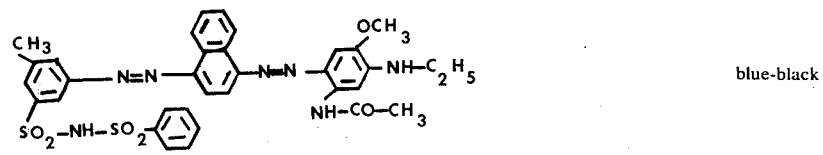 | blue-black |
| Example 73 | 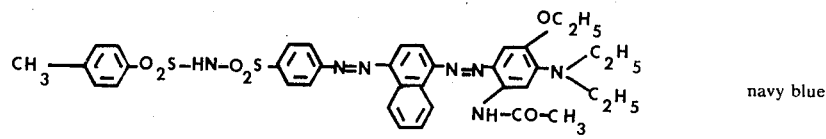 | navy blue | hydroxy, substituted $C_1$–$C_4$-alkyl or substituted $C_1$–$C_4$-alkoxy where the substituent of said substituted $C_1$–$C_4$-alkyl or of said substituted $C_1$–$C_4$-alkoxy is halogen, cyano, hydroxy, or phenyl;

$R_3$ is hydrogen, chlorine, bromine, $C_1$–$C_4$-alkyl, $C_1$–$C_4$-alkoxy, hydroxy, phenoxy, tolyloxy, substituted $C_1$–$C_4$-alkyl, or substituted $C_1$–$C_4$-alkoxy where the substituent of said substituted $C_1$–$C_4$-alkyl or of said substituted $C_1$–$C_4$-alkoxy is halogen, cyano, hydroxy, or phenyl;

$R_4$ is hydrogen, chlorine, bromine, $C_1$–$C_4$-alkyl, $C_1$–$C_4$-alkoxy, formylamino, ($C_1$–$C_4$-alkyl) carbonylamino, ($C_5$–$C_7$-cycloalkyl) carbonylamino, ($C_2$–$C_4$-alkenyl) carbonylamino, benzoylamino, $C_1$–$C_4$-alkylsulfonylamino, phenylsulfonylamino, ($C_1$–$C_4$-alkoxy) carbonylamino, chloropropionylamino, hydroxyacetylamino, phenoxyacetylamino, chlorobenzoylamino, dichlorobenzoylamino, phenacetylamino, substituted $C_1$–$C_4$-alkyl, or substituted $C_1$–$C_4$-alkoxy where the substituent of said substituted $C_1$–$C_4$-alkyl or of said substituted $C_1$–$C_4$-alkoxy is halogen, cyano, hydroxy, or phenyl;

$R_5$ and $R_6$ are $C_1$–$C_4$-alkyl or $C_1$–$C_4$-alkyl substituted by halogen, cyano, hydroxy, $C_1$–$C_4$-alkoxy, phenoxy, tolyloxy, benzoyloxy, ($C_1$–$C_4$-alkyl) carbonyloxy, ($C_1$–$C_4$-alkoxy) carbonyloxy, ($C_1$–$C_4$-alkoxy) carbonyl or phenyl;

$R_5$, additionally is hydrogen;

$n$ is the number 0, 1 or 2; and

B is a radical of the formula

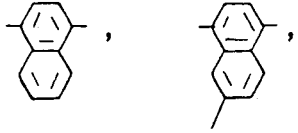

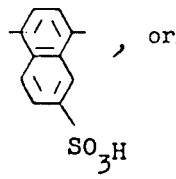, or 

2. Disazo dyestuff of claim 1 wherein $R_1$ is phenyl, naphthyl, $C_1$–$C_4$-alkyl, or phenyl substituted by $C_1$–$C_4$-alkyl, $C_1$–$C_4$-alkoxy, halogen, cyano, or nitro;

$R_2$ is chlorine, bromine, methyl, ethyl, methoxy, ethoxy, trifluoromethyl, or hydroxy; and $n$ is the number 0 or 1.

3. Disazo dyestuff of claim 1 of the formula

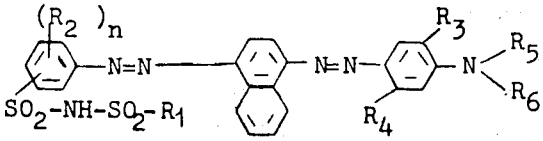

wherein the disulphimide group is in the meta-position or para-position relative to the azo bridge;

$R_1$ is $C_1$–$C_4$-alkyl, phenyl, or phenyl substituted by $C_1$–$C_4$-alkyl, $C_1$–$C_4$-alkoxy, halogen, cyano, or nitro;

$R_3$ is hydrogen, chlorine, bromine, methyl, ethyl, methoxy, or ethoxy; and $R_4$ is hydrogen, chlorine, bromine, methyl, ethyl, methoxy, ethoxy, formylamino, ($C_1$–$C_4$-alkyl)-carbonylamino, ($C_5$–$C_7$-cycloalkyl) carbonylamino, ($C_2$–$C_4$-alkenyl) carbonylamino, benzoylamino, $C_1$–$C_4$-alkylsulfonylamino, phenylsulfonylamino, ($C_1$–$C_4$-alkoxy) carbonylamino, chloropropionylamino, hydroxyacetylamino, phenoxyacetylamino, chlorobenzoylamino, dichlorobenzoylamino, phenacetylamino.

4. Disazo dyestuff of claim 3 wherein $R_3$ is hydrogen, methyl, ethyl, methoxy, or ethoxy; and $R_4$ is formylamino, ($C_1$–$C_4$-alkyl) carbonylamino, ($C_5$–$C_7$cycloalkyl) carbonylamino, ($C_2$–$C_4$-alkenyl) carbonylamino, benzoylamino, $C_1$–$C_4$-alkylsulfonylamino, phenylsulfonylamino, ($C_1$–$C_4$-alkoxy) carbonylamino, chloropropionylamino, hydroxyacetylamino, phenoxyacetylamino, chlorobenzoylamino, dichlorobenzoylamino, phenacetylamino, furanoylamino, or thenoylamino.

5. Disazo dyestuff of claim 4 wherein $R_3$ is hydrogen, methoxy, or ethoxy; and $R_4$ is ($C_1C_4$-alkyl) carbonylamino, ($C_1$–$C_4$-alkoxy)-carbonylamino, benzoylamino, chlorobenzoylamino, or dichlorobenzoylamino.

* * * * *